US011243434B2

United States Patent
Sharlin et al.

(10) Patent No.: US 11,243,434 B2
(45) Date of Patent: Feb. 8, 2022

(54) LCOS ILLUMINATION VIA LOE

(71) Applicant: LUMUS LTD., Ness Ziona (IL)

(72) Inventors: Elad Sharlin, Mishmar David (IL); Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 43 days.

(21) Appl. No.: 16/632,410

(22) PCT Filed: Jul. 19, 2018

(86) PCT No.: PCT/IL2018/050798
§ 371 (c)(1),
(2) Date: Jan. 20, 2020

(87) PCT Pub. No.: WO2019/016813
PCT Pub. Date: Jan. 24, 2019

(65) Prior Publication Data
US 2020/0209667 A1 Jul. 2, 2020

Related U.S. Application Data

(60) Provisional application No. 62/534,226, filed on Jul. 19, 2017.

(51) Int. Cl.
*G02F 1/13357* (2006.01)
*F21V 8/00* (2006.01)
(Continued)

(52) U.S. Cl.
CPC ....... *G02F 1/13362* (2013.01); *G02B 6/0015* (2013.01); *G02B 6/0035* (2013.01);
(Continued)

(58) Field of Classification Search
CPC ........... G02F 1/13362; G02F 1/136277; G02F 1/133616; G02F 2203/12; G02B 6/0015; G02B 6/0035
See application file for complete search history.

(56) References Cited

U.S. PATENT DOCUMENTS 2,748,659 A 6/1956 Geffcken et al.
2,958,258 A 11/1960 Kelly
(Continued)

FOREIGN PATENT DOCUMENTS

BE 357371 2/1929
CN 1606712 4/2005
(Continued)

OTHER PUBLICATIONS

International Commission on Non-Ionizing Radiation Protection "ICNIRP Guidelines for Limiting Exposure to Time-Varying Electric, Magnetic and Electromagnetic Fields (up to 300 GHZ)" Published In: Health Physics 74 (4):494-522; 1998.
(Continued)

*Primary Examiner* — Donald L Raleigh
(74) *Attorney, Agent, or Firm* — Mark M. Friedman

(57) ABSTRACT

A system for uniform optical illumination of an image light provider in a smaller (compact) configuration than conventional implementations includes a lightguide having: a first external surface and a second external surface mutually parallel, and a first sequence of facets, at least a portion of which are: a plurality of parallel, partially reflecting, and polarization selective surfaces, at an oblique angle relative to the first and second external surfaces, and between the first and second external surfaces, and a front-lit reflective polarization rotating image modulator: deployed to spatially modulate light coupled-out from the first external surface, outputting reflected light corresponding to an image, and deployed such that the reflected light traverses the lightguide from the first external surface via the first sequence of facets to the second external surface.

9 Claims, 9 Drawing Sheets

(51) Int. Cl.
*G02F 1/1362* (2006.01)
*G02F 1/1335* (2006.01)

(52) U.S. Cl.
CPC .. *G02F 1/136277* (2013.01); *G02F 1/133616* (2021.01); *G02F 2203/12* (2013.01)

(56) References Cited

U.S. PATENT DOCUMENTS

| | | |
|---|---|---|
| 3,626,394 A | 12/1971 | Nelson et al. |
| 3,658,405 A | 4/1972 | Pluta |
| 3,667,621 A | 6/1972 | Barlow |
| 3,677,621 A | 7/1972 | Smith |
| 3,737,212 A | 6/1973 | Antonson et al. |
| 3,807,849 A | 4/1974 | Lobb |
| 3,873,209 A | 3/1975 | Schinke et al. |
| 3,940,204 A | 2/1976 | Withrington |
| 4,084,883 A | 4/1978 | Eastman et al. |
| 4,233,526 A | 11/1980 | Kurogi et al. |
| 4,240,738 A | 12/1980 | Praamsma |
| 4,309,070 A | 1/1982 | St Leger Searle |
| 4,331,387 A | 5/1982 | Wentz |
| 4,372,639 A | 2/1983 | Johnson |
| 4,383,740 A | 5/1983 | Bordovsky |
| 4,516,828 A | 5/1985 | Steele |
| 4,613,216 A | 9/1986 | Herbec et al. |
| 4,711,512 A | 12/1987 | Upatnieks |
| 4,755,667 A | 7/1988 | Marsoner et al. |
| 4,775,217 A | 10/1988 | Ellis |
| 4,798,448 A | 1/1989 | Van Raalte |
| 4,799,765 A | 1/1989 | Ferrer |
| 4,805,988 A | 2/1989 | Dones |
| 4,932,743 A | 6/1990 | Isobe et al. |
| 5,033,828 A | 7/1991 | Haruta |
| 5,076,664 A | 12/1991 | Migozzi |
| 5,096,520 A | 3/1992 | Faris |
| 5,231,642 A | 7/1993 | Scifres et al. |
| 5,278,532 A | 1/1994 | Hegg et al. |
| 5,301,067 A | 4/1994 | Bleier et al. |
| 5,353,134 A | 10/1994 | Michel et al. |
| 5,369,415 A | 11/1994 | Richard et al. |
| 5,453,877 A | 9/1995 | Gerbe et al. |
| 5,481,385 A | 1/1996 | Zimmerman et al. |
| 5,499,138 A | 3/1996 | Iba |
| 5,537,260 A | 7/1996 | Williamson |
| 5,539,578 A | 7/1996 | Togino et al. |
| 5,543,877 A | 8/1996 | Takashi et al. |
| 5,555,329 A | 9/1996 | Kuper et al. |
| 5,594,830 A | 1/1997 | Winston et al. |
| 5,619,601 A | 4/1997 | Akashi et al. |
| 5,650,873 A | 7/1997 | Gal et al. |
| 5,680,209 A | 10/1997 | Maechler |
| 5,708,449 A | 1/1998 | Heacock et al. |
| 5,712,694 A | 1/1998 | Taira et al. |
| 5,724,163 A | 3/1998 | Yair |
| 5,751,480 A | 5/1998 | Kitagishi |
| 5,764,412 A | 6/1998 | Suzuki et al. |
| 5,808,709 A | 9/1998 | Davis |
| 5,808,800 A | 9/1998 | Handschy |
| 5,896,232 A | 4/1999 | Budd et al. |
| 5,909,325 A | 6/1999 | Kuba et al. |
| 5,966,223 A | 10/1999 | Amitai et al. |
| 5,982,536 A | 11/1999 | Swan |
| 6,007,225 A | 12/1999 | Ramer et al. |
| 6,021,239 A | 2/2000 | Minami et al. |
| 6,034,750 A | 3/2000 | Rai et al. |
| 6,052,500 A | 4/2000 | Takano et al. |
| 6,091,548 A | 7/2000 | Chen |
| 6,144,347 A | 11/2000 | Mizoguchi et al. |
| 6,204,975 B1 | 3/2001 | Watters et al. |
| 6,222,676 B1 | 4/2001 | Togino et al. |
| 6,222,971 B1 | 4/2001 | Veligdan et al. |
| 6,239,092 B1 | 5/2001 | Papasso et al. |
| 6,256,151 B1 | 7/2001 | Ma et al. |
| 6,266,108 B1 | 7/2001 | Bao |
| 6,307,612 B1 | 10/2001 | Smith |
| 6,310,713 B2 | 10/2001 | Doany et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,400,493 B1 | 6/2002 | Mertz et al. |
| 6,404,550 B1 | 6/2002 | Yajima |
| 6,404,947 B1 | 6/2002 | Matsuda |
| 6,406,149 B2 | 6/2002 | Okuyama |
| 6,421,031 B1 | 7/2002 | Ronzani et al. |
| 6,433,339 B1 | 8/2002 | Maeda et al. |
| 6,480,174 B1 | 11/2002 | Kaufmass et al. |
| 6,490,087 B1 | 12/2002 | Fulkerson et al. |
| 6,490,104 B1 | 12/2002 | Gleckman et al. |
| 6,509,982 B2 | 1/2003 | Steiner |
| 6,542,307 B2 | 4/2003 | Gleckman |
| 6,580,529 B1 | 6/2003 | Amitai et al. |
| 6,606,173 B2 | 8/2003 | Kappel et al. |
| 6,671,100 B1 | 12/2003 | McRuer |
| 6,690,513 B2 | 2/2004 | Hulse et al. |
| 6,704,052 B1 | 3/2004 | Togino et al. |
| 6,704,065 B1 | 3/2004 | Sharp et al. |
| 6,825,987 B2 | 11/2004 | Repetto et al. |
| 6,829,095 B2 | 12/2004 | Amitai |
| 6,879,443 B2 | 4/2005 | Spitzer et al. |
| 6,880,931 B2 | 4/2005 | Molitonl et al. |
| 6,894,821 B2 | 5/2005 | Kotchick |
| 6,950,220 B2 | 9/2005 | Abramson et al. |
| 7,021,777 B2 | 4/2006 | Amitai |
| 7,025,464 B2 | 4/2006 | Beeson et al. |
| 7,163,291 B2 | 1/2007 | Cado et al. |
| 7,285,903 B2 | 10/2007 | Cull et al. |
| 7,339,742 B2 | 3/2008 | Amitai et al. |
| 7,391,573 B2 | 6/2008 | Amitai |
| 7,392,917 B2 | 7/2008 | Alalu et al. |
| 7,418,170 B2 | 8/2008 | Mukawa et al. |
| 7,430,355 B2 | 9/2008 | Heikenfeld et al. |
| 7,448,170 B2 | 11/2008 | Milovan et al. |
| 7,457,040 B2 | 11/2008 | Amitai |
| 7,554,737 B2 | 6/2009 | Knox et al. |
| 7,576,916 B2 | 8/2009 | Amitai |
| 7,576,918 B2 | 8/2009 | Goggins |
| 7,577,326 B2 | 8/2009 | Amitai |
| 7,643,214 B2 | 1/2010 | Amitai |
| 7,667,962 B2 | 2/2010 | Mullen |
| 7,672,055 B2 | 3/2010 | Amitai |
| 7,710,655 B2 | 5/2010 | Freeman et al. |
| 7,724,441 B2 | 5/2010 | Amitai |
| 7,724,442 B2 | 5/2010 | Amitai |
| 7,724,443 B2 | 5/2010 | Amitai |
| 7,751,122 B2 | 7/2010 | Amitai |
| 7,777,960 B2 | 8/2010 | Freeman |
| 7,884,985 B2 | 2/2011 | Amitai |
| 7,995,275 B2 | 8/2011 | Maeda et al. |
| 8,000,020 B2 | 8/2011 | Amitai |
| 8,004,765 B2 | 8/2011 | Amitai |
| 8,035,872 B2 | 10/2011 | Ouchi |
| 8,098,439 B2 | 1/2012 | Amitai et al. |
| 8,187,481 B1 | 5/2012 | Hobbs |
| 8,405,573 B2 | 3/2013 | Lapidot et al. |
| 8,432,614 B2 | 4/2013 | Amitai |
| 8,467,133 B2 | 6/2013 | Miller |
| 8,611,015 B2 | 12/2013 | Wheeler et al. |
| 8,643,948 B2 | 2/2014 | Amitai et al. |
| 8,655,178 B2 | 2/2014 | Capron et al. |
| 8,665,178 B1 | 3/2014 | Wang |
| 8,783,893 B1 | 7/2014 | Seurin et al. |
| 8,786,519 B2 | 7/2014 | Blumenfeld et al. |
| 8,810,914 B2 | 8/2014 | Amitai et al. |
| 8,854,734 B2 | 10/2014 | Ingram |
| 8,861,081 B2 | 10/2014 | Amitai et al. |
| 8,902,503 B2 | 12/2014 | Amitai et al. |
| 8,913,865 B1 | 12/2014 | Bennett |
| 8,988,776 B2 | 3/2015 | Weber et al. |
| 8,998,414 B2 | 4/2015 | Bohn |
| 9,025,253 B2 | 5/2015 | Hadad et al. |
| 9,069,180 B2 | 6/2015 | Amitai et al. |
| 9,104,036 B2 | 8/2015 | Amitai et al. |

(56) References Cited

U.S. PATENT DOCUMENTS

| | | |
|---|---|---|
| 9,207,457 B2 | 12/2015 | Amitai |
| 9,248,616 B2 | 2/2016 | Amitai |
| 9,279,986 B2 | 3/2016 | Amitai |
| 9,316,832 B2 | 4/2016 | Amitai et al. |
| 9,417,453 B2 | 8/2016 | Amitai et al. |
| 9,448,408 B2 | 9/2016 | Amitai et al. |
| 9,488,840 B2 | 11/2016 | Mansharof et al. |
| 9,500,869 B2 | 11/2016 | Amitai |
| 9,513,481 B2 | 12/2016 | Levin et al. |
| 9,541,762 B2 | 1/2017 | Mukawa et al. |
| 9,551,874 B2 | 1/2017 | Amitai |
| 9,551,880 B2 | 1/2017 | Amitai |
| 9,568,738 B2 | 2/2017 | Mansharof et al. |
| 9,664,910 B2 | 5/2017 | Mansharof et al. |
| 9,709,809 B2 | 7/2017 | Miyawaki et al. |
| 9,740,013 B2 | 8/2017 | Amitai et al. |
| 9,804,396 B2 | 10/2017 | Amitai |
| 9,805,633 B2 | 10/2017 | Zheng |
| 9,910,283 B2 | 3/2018 | Amitai |
| 9,977,244 B2 | 5/2018 | Amitai |
| 10,048,499 B2 | 8/2018 | Amitai |
| 10,222,535 B2 | 3/2019 | Remhof et al. |
| 10,302,835 B2 | 5/2019 | Danziger |
| 10,302,957 B2 | 5/2019 | Sissom |
| 10,571,699 B1 | 2/2020 | Parsons et al. |
| 2001/0013972 A1 | 8/2001 | Doany et al. |
| 2001/0030860 A1 | 10/2001 | Kimura et al. |
| 2001/0055152 A1 | 12/2001 | Richards |
| 2002/0008708 A1 | 1/2002 | Weiss et al. |
| 2002/0015233 A1 | 2/2002 | Park |
| 2002/0021498 A1 | 2/2002 | Ohtaka |
| 2002/0080615 A1 | 6/2002 | Marshall et al. |
| 2002/0080622 A1 | 6/2002 | Pashley et al. |
| 2002/0085281 A1 | 9/2002 | Okabe |
| 2002/0176173 A1 | 11/2002 | Song |
| 2002/0186179 A1 | 12/2002 | Knowles |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0030912 A1 | 2/2003 | Gleckman et al. |
| 2003/0063042 A1 | 4/2003 | Friesem et al. |
| 2003/0090439 A1 | 5/2003 | Spitzer et al. |
| 2003/0165017 A1 | 9/2003 | Amitai et al. |
| 2003/0197938 A1 | 10/2003 | Schmidt et al. |
| 2003/0218718 A1 | 11/2003 | Moliton et al. |
| 2004/0080718 A1 | 4/2004 | Kojima |
| 2004/0085649 A1 | 5/2004 | Repetto et al. |
| 2004/0130797 A1 | 7/2004 | Leigh Travis |
| 2004/0136082 A1* | 7/2004 | Cado ............... G02B 27/283 351/159.56 |
| 2004/0137189 A1 | 7/2004 | Tellini et al. |
| 2004/0145814 A1 | 7/2004 | Rogers |
| 2004/0218271 A1 | 11/2004 | Hartmaier et al. |
| 2004/0263842 A1 | 12/2004 | Puppels |
| 2004/0264185 A1 | 12/2004 | Grotsch et al. |
| 2005/0018308 A1 | 1/2005 | Cassarly et al. |
| 2005/0023545 A1 | 2/2005 | Camras et al. |
| 2005/0024849 A1 | 2/2005 | Parker et al. |
| 2005/0083592 A1 | 4/2005 | Amitai et al. |
| 2005/0084210 A1 | 4/2005 | Cha |
| 2005/0173719 A1 | 8/2005 | Yonekubo et al. |
| 2005/0174658 A1 | 8/2005 | Long et al. |
| 2005/0180687 A1 | 8/2005 | Amitai |
| 2005/0248852 A1 | 11/2005 | Yamasaki |
| 2005/0265044 A1 | 12/2005 | Chen et al. |
| 2006/0052146 A1 | 3/2006 | Ou |
| 2006/0061555 A1 | 3/2006 | Mullen |
| 2006/0091784 A1 | 5/2006 | Conner et al. |
| 2006/0103590 A1 | 5/2006 | Divon |
| 2006/0126182 A1 | 6/2006 | Levola |
| 2006/0228073 A1 | 10/2006 | Mukawa |
| 2006/0268421 A1 | 11/2006 | Shimizu et al. |
| 2007/0035706 A1 | 2/2007 | Margulis |
| 2007/0070859 A1 | 3/2007 | Hirayama |
| 2007/0091445 A1* | 4/2007 | Amitai ............... G02B 27/28 359/630 |
| 2007/0153344 A1 | 7/2007 | Lin |
| 2007/0159673 A1* | 7/2007 | Freeman ............ G02B 27/145 359/19 |
| 2007/0165192 A1 | 7/2007 | Prior |
| 2007/0206390 A1 | 9/2007 | Brukilacchio et al. |
| 2007/0284565 A1 | 12/2007 | Leatherdale et al. |
| 2007/0285663 A1 | 12/2007 | Hewitt et al. |
| 2007/0291491 A1 | 12/2007 | Li et al. |
| 2008/0013051 A1 | 1/2008 | Glinski et al. |
| 2008/0025667 A1 | 1/2008 | Amitai |
| 2008/0030974 A1 | 2/2008 | Abu-Ageel |
| 2008/0062686 A1 | 3/2008 | Hoelen et al. |
| 2008/0068852 A1 | 3/2008 | Goihl |
| 2008/0151375 A1 | 6/2008 | Lin |
| 2008/0151379 A1 | 6/2008 | Amitai |
| 2008/0192239 A1 | 8/2008 | Otosaka |
| 2008/0198471 A1 | 8/2008 | Amitai |
| 2008/0198604 A1 | 8/2008 | Kim et al. |
| 2008/0278812 A1 | 11/2008 | Amitai |
| 2009/0009719 A1 | 1/2009 | Ryf |
| 2009/0010023 A1 | 1/2009 | Kanade et al. |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2009/0165017 A1 | 6/2009 | Syed et al. |
| 2009/0275157 A1 | 11/2009 | Winberg et al. |
| 2010/0002465 A1 | 1/2010 | Tsang et al. |
| 2010/0020291 A1 | 1/2010 | Kasazumi et al. |
| 2010/0027289 A1 | 2/2010 | Aiki et al. |
| 2010/0046234 A1 | 2/2010 | Abu-Ageel |
| 2010/0053148 A1 | 3/2010 | Khazenil et al. |
| 2010/0067110 A1 | 3/2010 | Amitai et al. |
| 2010/0171680 A1 | 7/2010 | Lapidot et al. |
| 2010/0201953 A1 | 8/2010 | Freeman et al. |
| 2010/0202048 A1 | 8/2010 | Amitai et al. |
| 2010/0202128 A1 | 8/2010 | Saccomanno |
| 2010/0202129 A1 | 8/2010 | Abu-Ageel |
| 2010/0214635 A1 | 8/2010 | Sasaki et al. |
| 2010/0278480 A1 | 11/2010 | Vasylyev et al. |
| 2010/0291489 A1 | 11/2010 | Moskovits et al. |
| 2010/0302276 A1 | 12/2010 | Levola |
| 2011/0007243 A1 | 1/2011 | Tanaka |
| 2011/0019250 A1 | 1/2011 | Aiki et al. |
| 2011/0096566 A1 | 4/2011 | Tsai et al. |
| 2011/0149547 A1 | 6/2011 | Bruzzone et al. |
| 2011/0228511 A1 | 9/2011 | Weber |
| 2012/0069547 A1 | 3/2012 | Gielen et al. |
| 2012/0147361 A1 | 6/2012 | Mochizuki et al. |
| 2012/0179539 A1 | 7/2012 | Lapidot et al. |
| 2012/0194781 A1 | 8/2012 | Agurok |
| 2012/0218301 A1 | 8/2012 | Miller |
| 2012/0281389 A1 | 11/2012 | Panagotacos et al. |
| 2012/0287621 A1 | 11/2012 | Lee et al. |
| 2013/0016292 A1* | 1/2013 | Miao ............... G02B 27/283 349/11 |
| 2013/0022316 A1 | 1/2013 | Pelletier et al. |
| 2013/0038933 A1 | 2/2013 | Wang |
| 2013/0120986 A1 | 5/2013 | Xi |
| 2013/0135749 A1 | 5/2013 | Akutsu et al. |
| 2013/0201690 A1 | 8/2013 | Vissenberg et al. |
| 2013/0208498 A1 | 8/2013 | Ouderkirk |
| 2013/0215361 A1 | 8/2013 | Wang |
| 2013/0229717 A1 | 9/2013 | Amitai |
| 2013/0242392 A1 | 9/2013 | Amirparviz et al. |
| 2013/0257832 A1 | 10/2013 | Hammond |
| 2013/0276960 A1 | 10/2013 | Amitai |
| 2013/0279017 A1 | 10/2013 | Amitai |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0104852 A1 | 4/2014 | Duong et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |

(56) References Cited

U.S. PATENT DOCUMENTS

| | | |
|---|---|---|
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0140654 A1 | 5/2014 | Brown et al. |
| 2014/0177049 A1 | 6/2014 | Beck |
| 2014/0192539 A1 | 7/2014 | Yriberri et al. |
| 2014/0226215 A1 | 8/2014 | Komatsu |
| 2014/0226361 A1 | 8/2014 | Vasylyev |
| 2014/0264420 A1 | 9/2014 | Edwards et al. |
| 2014/0293434 A1 | 10/2014 | Cheng |
| 2014/0334126 A1 | 11/2014 | Speier et al. |
| 2014/0374377 A1 | 12/2014 | Schulz |
| 2015/0009682 A1 | 1/2015 | Clough |
| 2015/0009687 A1 | 1/2015 | Lin |
| 2015/0016777 A1 | 1/2015 | Abovitz et al. |
| 2015/0049486 A1 | 2/2015 | Jung et al. |
| 2015/0081313 A1 | 3/2015 | Boross et al. |
| 2015/0098206 A1 | 4/2015 | Pickard et al. |
| 2015/0103151 A1 | 4/2015 | Carls et al. |
| 2015/0103306 A1 | 4/2015 | Kaji et al. |
| 2015/0138451 A1 | 5/2015 | Amitai |
| 2015/0153569 A1 | 6/2015 | Yonekubo |
| 2015/0160529 A1 | 6/2015 | Popovich et al. |
| 2015/0182348 A1 | 7/2015 | Siegal et al. |
| 2015/0182748 A1 | 7/2015 | Gefen et al. |
| 2015/0185475 A1 | 7/2015 | Saarikko et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0247617 A1 | 9/2015 | Du et al. |
| 2015/0260992 A1 | 9/2015 | Luttmann et al. |
| 2015/0277127 A1 | 10/2015 | Amitai |
| 2015/0293360 A1 | 10/2015 | Amitai |
| 2015/0355481 A1 | 12/2015 | Hilkes et al. |
| 2016/0041387 A1 | 2/2016 | Valera et al. |
| 2016/0109712 A1 | 4/2016 | Harrison et al. |
| 2016/0116743 A1 | 4/2016 | Amitai |
| 2016/0161740 A1 | 6/2016 | Bar-Zeev et al. |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0189432 A1 | 6/2016 | Bar-Zeev et al. |
| 2016/0209648 A1 | 7/2016 | Haddick et al. |
| 2016/0209657 A1 | 7/2016 | Popovich et al. |
| 2016/0215956 A1 | 7/2016 | Smith et al. |
| 2016/0234485 A1 | 8/2016 | Robbins et al. |
| 2016/0266387 A1 | 9/2016 | Tekolste et al. |
| 2016/0313567 A1 | 10/2016 | Kurashige |
| 2016/0314564 A1 | 10/2016 | Jones |
| 2016/0327906 A1 | 11/2016 | Futterer |
| 2016/0341964 A1 | 11/2016 | Amitai |
| 2016/0349518 A1 | 12/2016 | Amitai et al. |
| 2016/0370534 A1 | 12/2016 | Liu et al. |
| 2017/0003504 A1 | 1/2017 | Vallius et al. |
| 2017/0011555 A1 | 1/2017 | Li et al. |
| 2017/0017095 A1 | 1/2017 | Fricker et al. |
| 2017/0045666 A1 | 2/2017 | Vasylyev |
| 2017/0045744 A1 | 2/2017 | Amitai |
| 2017/0052376 A1 | 2/2017 | Amitai |
| 2017/0052377 A1 | 2/2017 | Amitai |
| 2017/0122725 A1 | 5/2017 | Yeoh |
| 2017/0176755 A1 | 6/2017 | Cai |
| 2017/0242249 A1 | 8/2017 | Wall |
| 2017/0276947 A1 | 9/2017 | Yokoyama |
| 2017/0299860 A1 | 10/2017 | Wall et al. |
| 2017/0336636 A1 | 11/2017 | Amitai et al. |
| 2017/0343822 A1 | 11/2017 | Border et al. |
| 2017/0353714 A1 | 12/2017 | Poulad et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0120559 A1 | 5/2018 | Yeoh et al. |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |

FOREIGN PATENT DOCUMENTS

| | | |
|---|---|---|
| CN | 1795399 | 6/2006 |
| CN | 101542346 | 9/2009 |
| CN | 101846799 | 9/2010 |
| DE | 1422172 | 11/1970 |
| DE | 19725262 | 12/1998 |
| DE | 102013106392 | 12/2014 |
| EP | 0365406 | 4/1990 |
| EP | 0380035 | 8/1990 |
| EP | 0399865 | 11/1990 |
| EP | 0543718 | 5/1993 |
| EP | 0566004 | 10/1993 |
| EP | 0580952 | 2/1994 |
| EP | 1096293 | 5/2001 |
| EP | 1158336 | 11/2001 |
| EP | 1180711 | 2/2002 |
| EP | 1326102 | 7/2003 |
| EP | 1385023 | 1/2004 |
| EP | 1485747 | 12/2004 |
| EP | 1562066 | 8/2005 |
| EP | 1691547 | 8/2006 |
| EP | 0770818 | 4/2007 |
| EP | 1779159 | 5/2007 |
| FR | 2496905 | 6/1982 |
| FR | 2638242 | 4/1990 |
| FR | 2721872 | 1/1996 |
| GB | 1321303 | 6/1973 |
| GB | 2220081 | 12/1989 |
| GB | 2272980 | 6/1994 |
| GB | 2278222 | 11/1994 |
| GB | 2278888 | 12/1994 |
| IL | 183637 | 6/2013 |
| JP | 2002539498 | 11/2002 |

(56) References Cited

FOREIGN PATENT DOCUMENTS

| | | |
|---|---|---|
| JP | 2002350771 | 12/2002 |
| JP | 2002368762 | 12/2002 |
| JP | 2003140081 | 5/2003 |
| JP | 2003149643 | 5/2003 |
| JP | 2003520984 | 7/2003 |
| JP | 2003536102 | 12/2003 |
| JP | 2004233909 | 8/2004 |
| JP | 2004527801 | 9/2004 |
| JP | 2005084522 | 3/2005 |
| JP | 2006145644 | 6/2006 |
| JP | 2011221235 | 11/2011 |
| JP | 2012163659 | 8/2012 |
| KR | 101470387 | 12/2014 |
| TW | 201809798 | 3/2018 |
| WO | 9314393 | 7/1993 |
| WO | 9510106 | 4/1995 |
| WO | 9815868 | 4/1998 |
| WO | 9952002 | 10/1999 |
| WO | 0004407 | 1/2000 |
| WO | 0055676 | 9/2000 |
| WO | 0063738 | 10/2000 |
| WO | 0127685 | 4/2001 |
| WO | 0195025 | 12/2001 |
| WO | 0195027 | 12/2001 |
| WO | 02082168 | 10/2002 |
| WO | 2082168 | 10/2002 |
| WO | 02088825 | 11/2002 |
| WO | 02097515 | 12/2002 |
| WO | 03058320 | 7/2003 |
| WO | 03081320 | 10/2003 |
| WO | 2004053541 | 6/2004 |
| WO | 2004109349 | 12/2004 |
| WO | 2005024485 | 3/2005 |
| WO | 2005024491 | 3/2005 |
| WO | 2005024969 | 3/2005 |
| WO | 2005093493 | 10/2005 |
| WO | 2005124427 | 12/2005 |
| WO | 2006013565 | 2/2006 |
| WO | 2006061927 | 6/2006 |
| WO | 2006085308 | 8/2006 |
| WO | 2006085309 | 8/2006 |
| WO | 2006085310 | 8/2006 |
| WO | 2006087709 | 8/2006 |
| WO | 2007054928 | 5/2007 |
| WO | 2007093983 | 8/2007 |
| WO | 2008023367 | 2/2008 |
| WO | 2008129539 | 10/2008 |
| WO | 2008149339 | 12/2008 |
| WO | 2009074638 | 6/2009 |
| WO | 2011130720 | 10/2011 |
| WO | 2012008966 | 1/2012 |
| WO | 2013065656 | 5/2013 |
| WO | 2013112705 | 8/2013 |
| WO | 2013175465 | 11/2013 |
| WO | 2013188464 | 12/2013 |
| WO | 2014076599 | 5/2014 |
| WO | 2014155096 | 10/2014 |
| WO | 2015012280 | 1/2015 |
| WO | 2015081313 | 6/2015 |
| WO | 2016103251 | 6/2016 |
| WO | 2016132347 | 8/2016 |
| WO | 2017106873 | 6/2017 |
| WO | 2018138714 | 8/2018 |

OTHER PUBLICATIONS

Jan van de Kraats et al. "Directional and nondirectional spectral reflection from the human fovea" journal of biomedical optics 13(2), 024010 Mar./Apr. 2008.
Lenses and Simple Optics, http://www.nightlase.com.au/education/optics/index.html (Year: 2004).

* cited by examiner

LCOS ILLUMINATION VIA LOE

FIELD OF THE INVENTION

The present invention generally relates to optical illumination, and in particular, it concerns uniform illumination of an image light provider.

BACKGROUND OF THE INVENTION

Referring to FIG. 1, there is shown a conventional implementation of an architecture for illumination. A light source 2L produces an unpolarized, uniformly illuminated input beam 4L. The unpolarized input beam 4L is polarized by a polarizer 103 to produce a polarized, uniformly illuminated input beam 4P, assumed to be polarized S-pol (S-polarization). The polarized input beam 4P is input to a polarizing beam splitter (PBS) 104 and reflected by a polarization selective reflector 105 as ray 124 onto the liquid crystal on silicon (LCOS) matrix 106. The LCOS matrix 106 is illuminated from the front of the LCOS, spatially modulates the reflected light as an image by changing polarization of the illumination, and reflects the light back as an image ray 126. The LCOS rotates the polarization of the reflected light from the S-pol of ray 124 to P-pol (P-polarization) for white pixels in ray 126 while the polarization for black pixels is unchanged (remains S-pol). The light from the white pixels having P-polarization in ray 126 passes through the polarization selective reflector 105 while the light from the black pixels having S-polarization in ray 126 do not pass through the polarization selective reflector 105. The P-pol ray 126 then propagates on toward projecting optics 107 (generally of a projecting system, depicted schematically as lens). The projecting optics 107 performs collimation and other functions, as necessary for specific applications.

SUMMARY

According to the teachings of the present embodiment there is provided a optical system including: a lightguide having: a first external surface and a second external surface mutually parallel, and a first sequence of facets, at least a portion of which are: a plurality of parallel, partially reflecting, and polarization selective surfaces, at an oblique angle relative to the first and second external surfaces, and between the first and second external surfaces, and a front-lit reflective polarization rotating image modulator: deployed to spatially modulate light coupled-out from the first external surface, outputting reflected light corresponding to an image, and deployed such that the reflected light traverses the lightguide from the first external surface via the first sequence of facets to the second external surface.

In an optional embodiment, each of the facets reflects at least a portion of first polarized light and transmits a remaining portion of the first polarized light, and transmits second polarized light.

In another optional embodiment, the reflectivity of the first polarization increases from one facet to a subsequent facet in the first sequence of facets.

In another optional embodiment, the first polarized light is coupled-out from the first external surface, and the reflected light is of the second polarized light.

In another optional embodiment, the first sequence of facets expands light in-coupled to the lightguide such that the light is uniformly coupled-out of the first external surface.

In another optional embodiment, the image modulator is a liquid crystal on silicon (LCOS) matrix.

In another optional embodiment, the facets are constructed at least in part using a technique selected from the group consisting of: multi-layer coatings, a dielectric coating, and a wire-grid.

In another optional embodiment, orientation of a primary axis of the facets determines reflectivity of the facets.

In another optional embodiment, reflectivity of each of the facets is dependent on an angle light impinges of the facet.

In another optional embodiment, the first sequence of facets is configured to perform coupling-out of light from the first external surface, the first sequence of facets having a constant number of facets overlapping in a line of sight toward a nominal point of observation of light coupling-out of the first external surface.

In another optional embodiment, further including: a second sequence of facets, at least a portion of which are: a plurality of parallel, partially reflecting, and polarization selective surfaces, at an oblique angle relative to the first and second external surfaces, and between the first and second external surfaces, wherein the facets of the first sequence of facets and the second sequence of facets are non-parallel relative to each other.

In another optional embodiment, each of the sequences of facets spans an area of coverage, the spanning being an area over which each of the sequences of facets are deployed, and wherein the areas of coverage for the first and second sequences of facets are at least partially overlapping.

BRIEF DESCRIPTION OF FIGURES

The embodiment is herein described, by way of example only, with reference to the accompanying drawings, wherein.

DETAILED DESCRIPTION—FIG. 2 TO FIG. 11B

The principles and operation of the system according to a present embodiment may be better understood with reference to the drawings and the accompanying description. A present invention is a system for optical illumination. The system facilitates uniform illumination of an image light provider in a smaller (compact) configuration than conventional implementations.

A system for uniform optical illumination of an image light provider in a smaller (compact) configuration than conventional implementations includes a lightguide having: a first external surface and a second external surface mutually parallel, and a first sequence of facets, at least a portion of which are: a plurality of parallel, partially reflecting, and polarization selective surfaces, at an oblique angle relative to the first and second external surfaces, and between the first and second external surfaces, and a front-lit reflective polarization rotating image modulator: deployed to spatially modulate light coupled-out from the first external surface, outputting reflected light corresponding to an image, and deployed such that the reflected light traverses the lightguide from the first external surface via the first sequence of facets to the second external surface.

Basic Technology

Figure 1:
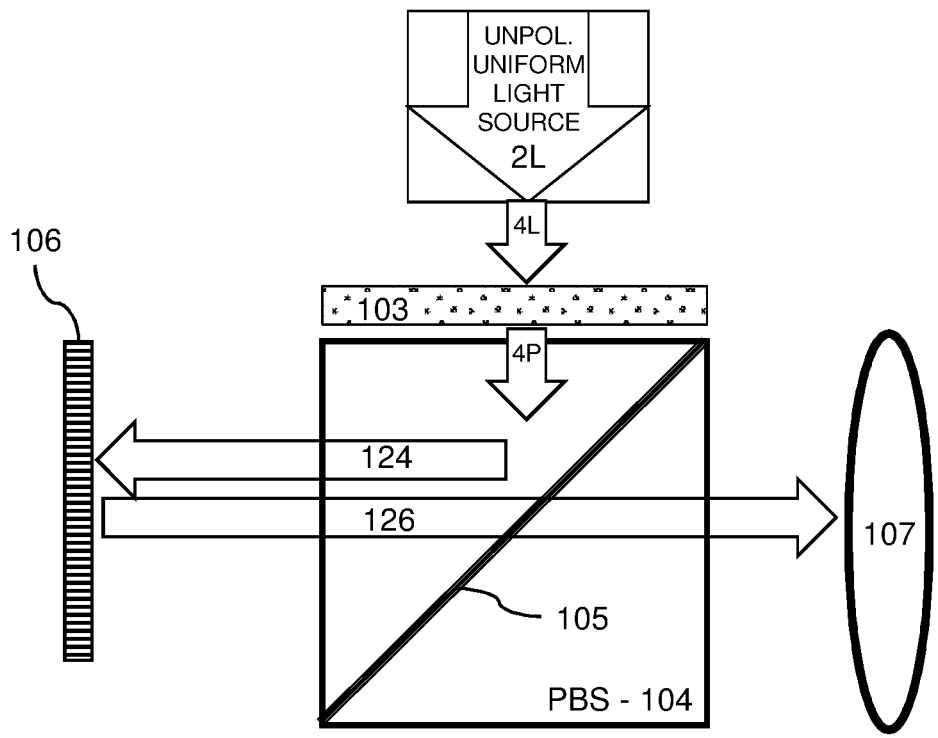
FIG. 1, a conventional implementation of an architecture for illumination.
Figure 2:
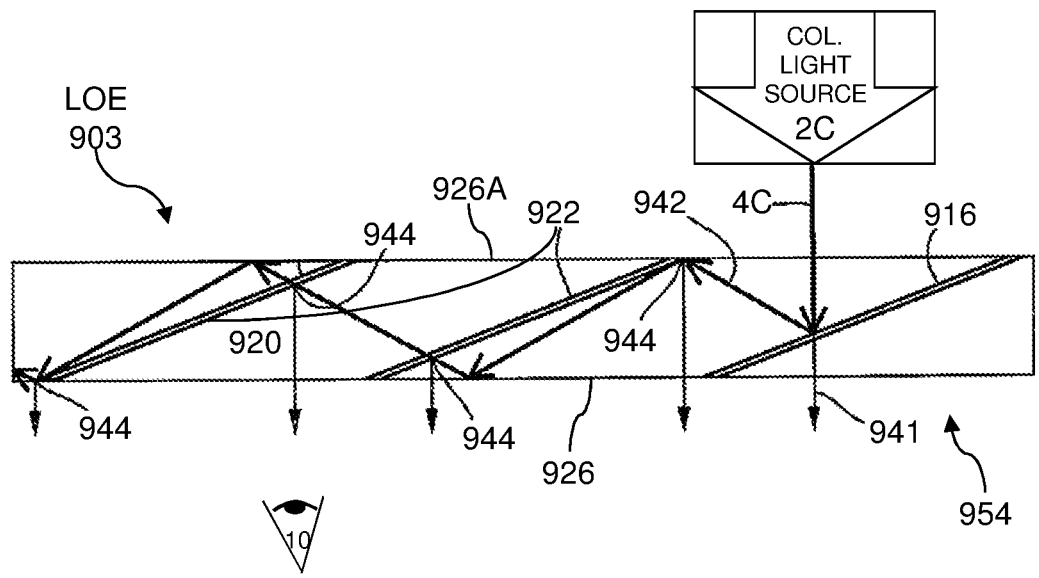
FIG. 2, a side view of an exemplary lightguide optical element (LOE) 903 configured for use with the current embodiment.

Referring to FIG. 2, there is shown a side view of an exemplary lightguide optical element (LOE) 903 configured for use with the current embodiment. A collimated light source 2C emanates a collimated input beam 4C. In the context of this document, light sources are also referred to as "projectors." Light sources can be lasers or an LED that transmits a single or plurality of wavelengths. The light has a plurality of angular propagation directions that are oriented around the axis of the transmission, such as in a lightguide. For simplicity in the current figures, generally only the center direction of propagation is depicted for clarity. Only one light ray is generally depicted, the incoming light ray, the input beam (for example the collimated input beam 4C), also referred to as the "beam" or the "incoming ray". Generally, wherever an image is represented herein by a light beam, it should be noted that the beam is a sample beam of the image, which typically is formed by multiple beams at slightly differing angles each corresponding to a point or pixel of the image. Except where specifically referred to as an extremity of the image, the beams illustrated are typically a centroid of the image. That is, the light corresponds to an image and the central ray is a center ray from a center of the image or a central pixel of the image.

A first reflecting surface 916 is illuminated by the collimated input beam 4C. A first region 954 is proximal to the collimated input beam 4C where an image illumination is coupled into a lightguide 920. The reflecting surface 916 at least partially reflects the incident light of the collimated input beam 4C from the collimated light source 2C such that the light is trapped inside the lightguide 920 by internal reflection, typically total internal reflection (TIR). The lightguide 920 is typically a transparent substrate, and is also referred to as a "planar substrate", "light-transmitting substrate", and "waveguide". The lightguide 920 includes at least two (major, external) surfaces, typically parallel to each other (mutually parallel), shown in the current figure as a first (back, major) surface 926 and a front (second, major) surface 926A. Note that the designation of "front" and "back" with regard to the major surfaces (926, 926A) is for convenience of reference. Coupling-in to the lightguide 920 can be from various surfaces, such as the front, back, side edge, or any other desired coupling-in geometry.

The collimated input beam 4C enters the lightguide substrate at a proximal end of the substrate (right side of the figure). Light propagates through the lightguide 920 and one or more facets, normally at least a plurality of facets, and typically several facets, toward a distal end of the lightguide 920 (left side of the figure). The lightguide 920 typically guides rays of propagating light in the substrate by internal reflection of the external surfaces.

After optionally reflecting off the internal surfaces of the substrate 920, the trapped waves reach a set of selectively reflecting surfaces (facets) 922, which couple the light out of the substrate into the eye 10 of a viewer. In the current exemplary figure, the trapped ray is gradually coupled out from the substrate 920 by two other partially reflecting surfaces 922 at the points 944.

Internal, partially reflecting surfaces, such as the set of selectively reflecting surfaces 922 are generally referred to in the context of this document as "facets." For applications such as augmented reality, the facets are partially reflecting, allowing light from the real world to enter via the front surface 926A, traverse the substrate including facets, and exit the substrate via the back surface 926 to the eye 10 of the viewer. Exemplary ray 942 shows light of the collimated input beam 4C partially reflected from reflecting surface 916, and exemplary ray 941 shows light of the collimated input beam 4C partially transmitted through reflecting surface 916.

The internal partially reflecting surfaces 922 generally at least partially traverse the lightguide 920 at an oblique angle (i.e., non-parallel, neither parallel nor perpendicular) to the direction of elongation of the lightguide 920. Partial reflection can be implemented by a variety of techniques, including, but not limited to transmission of a percentage of light, or use of polarization.

The lightguide 920 optionally has a second pair of external surfaces (not shown in the current figure side view) parallel to each other and non-parallel to the first pair of external surfaces. In some implementations, the second pair of external surfaces is perpendicular to the first pair of external surfaces. Typically, each of the facets is at an oblique angle to the second pair of external surfaces. In other cases, where reflections from peripheral surfaces of the lightguide are not desired, those peripheral surfaces are typically left unpolished and/or coated with light absorbent (e.g., black) material to minimize undesired reflections.

First Embodiment

Figure 3A:
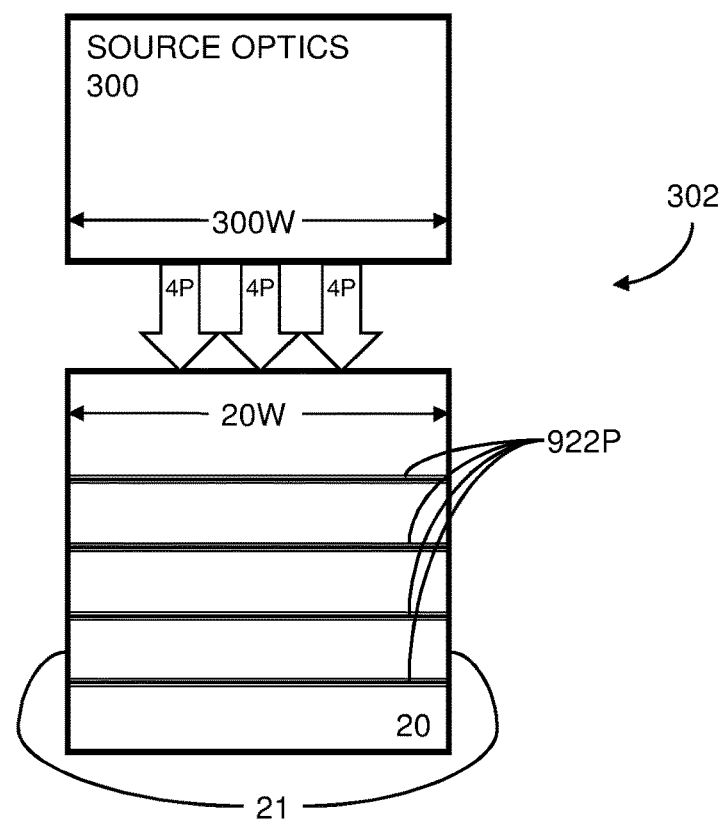
FIG. 3A and FIG. 3B, respective front and side view sketches of an exemplary compact system for optical illumination 302.
Figure 3B:
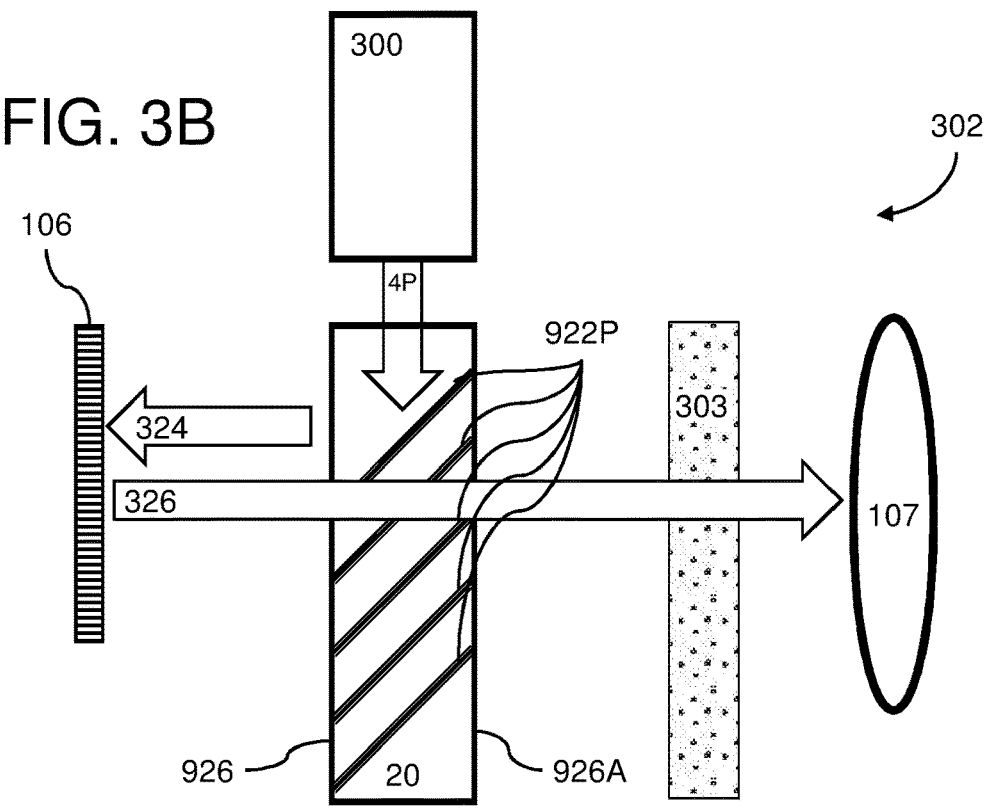

Referring to FIG. 3A and FIG. 3B, there are shown respective front and side view sketches of an exemplary compact system for optical illumination 302. The conventional PBS 104 is replaced by a lightguide (waveguide) polarization splitter (WGPS), such as a lightguide 20 (similar to the LOE 903 described above). Source optics 300 provides polarized light with uniform illumination 4P into the lightguide 20. Source optics 300 has an exit width 300W and lightguide 20 has an input width 20W of the polarized light uniform illumination 4P. The side faces 21 (second pair of external faces) of the lightguide 20 can be coated with a reflective coating in order to prevent energy loss from the sides. While the collimated input beam 4C was described above as being used by the LOE 903, the polarized light with uniform illumination 4P into the lightguide 20 is preferably not strictly collimated, but illuminates a spread of angles within a determined range of angles.

As light (uniform polarized light 4P) propagates along the lightguide 20 the light is partially reflected by a sequence of polarization selective facets 922P. The polarization selective partially reflecting facets 922P are similar to the above-described set of selectively reflecting surfaces (facets) 922, with the selective reflection based on polarization. These polarization selective facets 922P reflect a first polarization (for example S-pol) of light 324 and transmit a second, orthogonal, polarization (for example P-pol) of light 326.

An innovative feature of the current embodiment is that the facets are polarization selective and partially reflecting. This feature can be implemented during the production process of the lightguide 20. Refer to U.S. Pat. No. 6,829,095 (granted 2004 Dec. 7 and assigned to LUMUS Ltd) for general exemplary method of production. Preferred methods of creating the polarization selective partially reflecting facets are to use a dielectric coating or wire-grid between plates of the lightguide. It is foreseen that other methods of implementing partially reflecting polarization selectivity can be developed and could be implemented for the current embodiment. In the case of using a wire-grid, the wire-grid polarizer can be made only partially reflective to the polarization (parallel to the wires) by controlling parameters of the wire-grid such as the conductivity of the wires. For example, less conductive wires can be used for less reflection. Conductivity can be controlled by wire material, thickness, and spacing. Another option to control reflectivity is to rotate, or "twist" the wire grid. A combination of techniques, such as combining a dielectric material with a wire-grid, controls intensity of light on the wire-grid, and therefore controls the reflectivity. Additional information and exemplary graphs of polarization selective coatings can be found for example in U.S. Pat. No. 7,643,214 (granted 2010 Jan. 5 and assigned to LUMUS Ltd.).

The first polarized light 324 is output from the lightguide 20 via the first external surface 926 toward a front-lit reflective polarization rotating image modulator, for example, the LCOS 106. For simplicity in the current description, specific implementation using an LCOS will be described. The first polarized light 324 impinges on the LCOS 106. Preferably, the first polarized light 324 illuminates every pixel with a cone of light around appropriate center angle. Preferably, the lightguide 20 should be slightly away from the LCOS 106 in order to prevent observable non-uniformities. The impinging first polarized light 324 is spatially modulated by polarization rotation by the LCOS 106 and reflected toward the lightguide 20. For example, the first polarized light 324 is reflected and rotated as the (orthogonal) second polarized light 326. As the polarization selective facets 922P are designed to be transparent to this second polarization light 326, the second polarized light 326 passes through (traverses) the lightguide 20 from the first external surface 926, via the polarization selective facets 922P, and exits from the second external surface 926A toward the projecting optics 107. In order to filter out scattered light, an optional polarizer 303 can be deployed between the lightguide 20 and the projecting optics 107. In the current example, the polarizer 303 is at P-pol orientation and filters any S-pol polarized light.

Figure 3C:
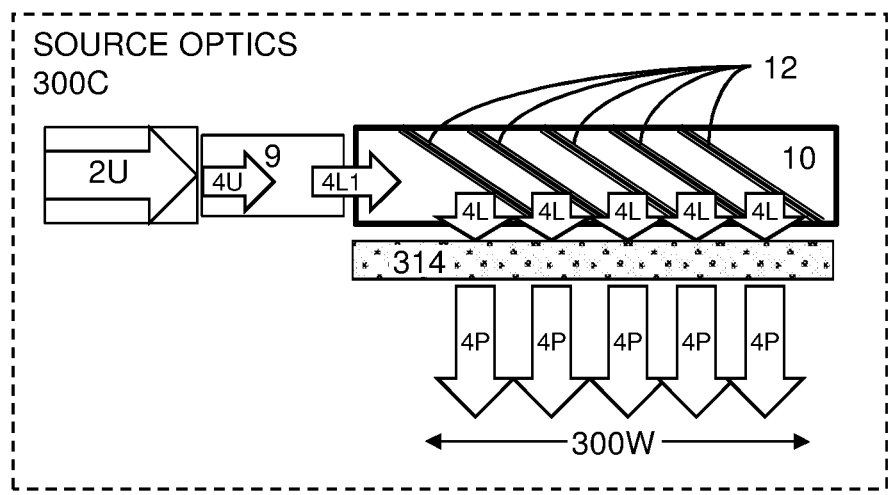
FIG. 3C, a sketch of a first exemplary embodiment 300C of source optics 300.

Referring to FIG. 3C, there is shown a sketch of a first exemplary embodiment 300C of source optics 300. The unpolarized light source 2U emits (not necessarily uniform) unpolarized light 4U that is introduced perpendicularly into a 2D (two-dimensional) lightguide 9. As the light propagates and reflects in the 2D lightguide 9 the light's illumination becomes more uniform 4L1. An optional diffuser (not shown) can be placed before the lightguide 20, for example, along, or as part of external faces of the 2D lightguide 9 to improve further light uniformity across the output width of the lightguide 9. Optionally, a small PBS can be introduced into the 2D lightguide 9. The small PBS can be used to pass S-polarized light, while outputting P-polarized light that is then rotated by ½ wave-plate to be S-pol and combined in parallel with the passed S-polarization, thereby avoiding loss of 50% power. Alternatively, to 2D lightguide 9, other implementations are known in the art for generating uniform light 4L1.

The uniform light 4L1 then enters a first lightguide 10 that has internal partial reflecting facets 12 (similar to the above-described LOE 903 with selectively reflecting facets 922). These facets are at an angle to reflect the internal propagating light out of first lightguide 10 as light with uniform illumination 4L towards the lightguide 20.

Optionally and preferably, the light with uniform illumination 4L reflected out of the first lightguide 10 then passes through optional polarization management 314. Polarization management 314 components can include a polarizer (similar to polarizer 103, described above) and a ½ wave plate. A pure polarization is preferred in order to minimize scattering of light in the lightguide 20 and to obtain a high contrast image from the LCOS 106. Orientation of a polarizer is preferably along a direction of maximal intensity coupled out by the facets 12 (most probably S-polarization). Since generally coatings (on the facets 12) and/or wire-grids reflect S-polarization at much higher efficiency than P-polarization, mostly the S-pol component of the uniform light 4L1 will be reflected as uniform illumination 4L. A waveplate is required if polarization orientation emitted by the first lightguide 10 (and filtered by the polarizer if used) does not overlap the optimal polarization for a next stage in the light propagation path. In a typical case, the S-pol from the first lightguide 10 is oriented as P-pol after reflection therefore a ½ wave-plate is required to obtain the S-pol orientation again.

The polarization management 314 is optional, depending on purity of the first polarized light 324 impinging on the LCOS 106 (single polarization is preferred for good image contrast). The polarization management 314 should preferably be as thin as possible, without disrupting the TIR in the first lightguide 10. One alternative is for the polarization management 314 to be glued between the first lightguide 10 and the lightguide 20 by low index glue (n~1.3 for example).

As the lightguide 20 does not do imaging, the light propagation in the lightguide 20 can be injected along an axis of the lightguide 20 corresponding to a direction of the sequence of facets. In this case, a low index glue (for example, with n=1.3) can be used on the external facets of the lightguides 10 and 20. The glue can be between the 2D lightguide 9 and the first lightguide 10, between the lightguide 20 and the projecting optics 107 (prism for example), and between the lightguide 20 and the LCOS 106. This way there will be no air-gap.

Figure 3D:
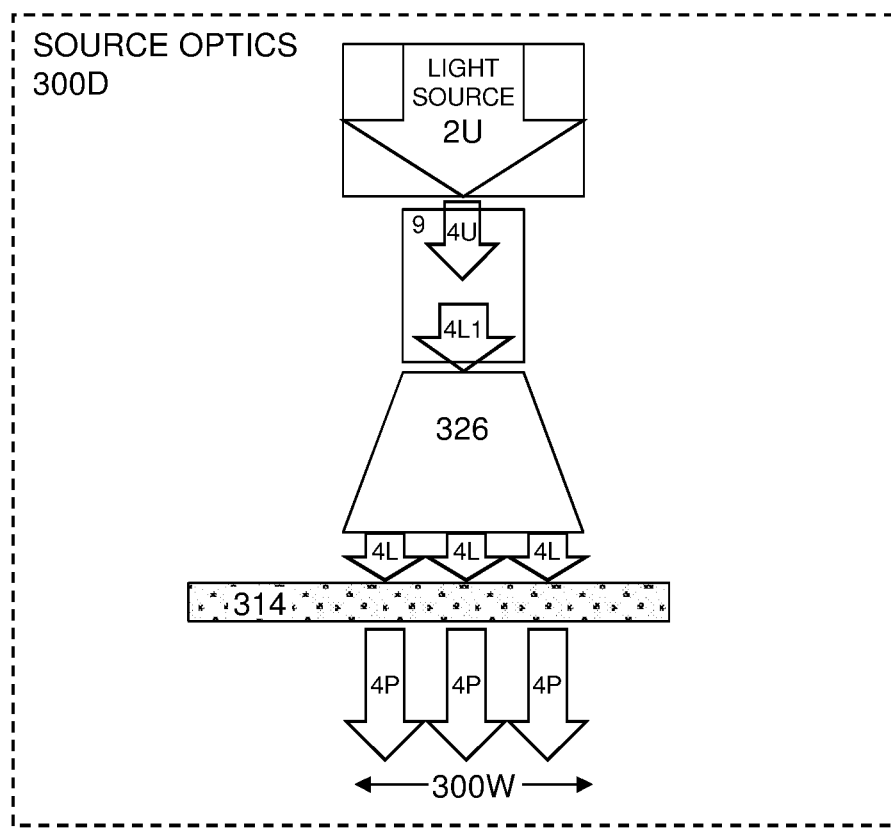
FIG. 3D, a sketch of a second exemplary embodiment 300D of source optics 300.

Referring to FIG. 3D, there is shown a sketch of a second exemplary embodiment 300D of source optics 300. The light source 2U emits unpolarized light 4U that is introduced perpendicularly into the 2D lightguide 9. As the light propagates and reflects in the 2D lightguide 9 the light's illumination becomes more uniform 4L1. The uniform light 4L1 then enters a tapered non-imaging lightguide 326 that laterally expands the internal propagating light out of the tapered non-imaging lightguide 326 as light with uniform illumination 4L towards (optional polarization management 314 and) the lightguide 20.

In both of the above exemplary embodiments, the polarized light with uniform illumination 4P, is output from the source optics (300C, 300D) and enters the lightguide 20.

Optionally, prior to injection of light (the polarized light with uniform illumination 4P) into the lightguide 20, light with improper angular distribution is filtered, that is, light that does not overlap the desired image. Therefore, only angular distribution overlapping the image is injected into the lightguide 20. This technique reduces the scattering and contrast reduction.

The lightguides (the lightguide 20, the first lightguide 10) can be based on metallic coating, dielectric coating, or on total internal reflection (TIR) in order to reflect the propagating light internally. The face between the first lightguide 10 and lightguide 20 is preferably angular selective transmittance, preferably based on TIR The combination of aperture management and/or partial reflectors, waveguide-based reflection, coating management, and 2D expansion are features of the compact system for optical illumination 302, more compact than conventional implementations such as based on polarizing beam splitters. A more compact system allows for reduction in cost, weight, and possibly more room for imaging/projecting optics 107.

Alternative Embodiment

Figure 4A:
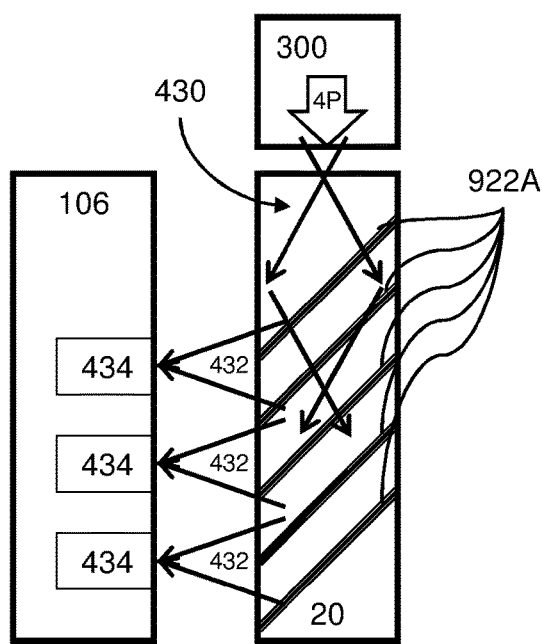
FIG. 4A, a sketch of a side view of facets with uniform angular response.

Referring to FIG. 4A, there is shown a sketch of a side view of facets with uniform angular response. Illumination of the LCOS 106 can be improved by configuring angular reflectivity of facets in the lightguide 20. The lightguide 20 includes a sequence of facets 922A (similar to the above-described set of facets 922). Several exemplary pixels 434 of the LCOS 106 are shown. Polarized light with uniform illumination 4P enters the lightguide 20 as angular distribution 430. The facets 922A have uniform angular response, therefore, the reflecting pixels 434 all see the same illumination angle cones 432 and will reflect the same illumination angle cones 432. The current configuration improves illumination for telecentric optics, for example if the projecting optics 107 are telecentric.

Figure 4B:
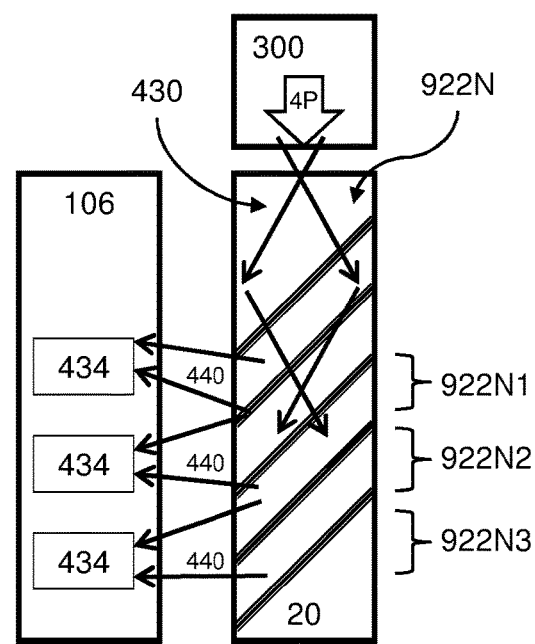
FIG. 4B, a sketch of a side view of facets with differing angular response.

Referring to FIG. 4B, there is shown a sketch of a side view of facets with differing angular response. For a non-telecentric optical configuration, facets 922N (similar to the above-described set of facets 922) can be constructed with differing angular reflectivities, resulting in differing illumination angle cones 440. In this exemplary configuration, facets in section 922N1 will reflect light at larger angles (relative to a vertex, where each vertex is perpendicular to the same one external surface of the lightguide 20) and be transmissive to all other angles. Facets in sections 922N2, 922N1, and 922N3 all reflect at a same angular spread, but the angular spread of each section is relative to (centered on) a different angular spread.

For reference, in telecentric illumination, the chief rays are collimated and parallel to the optical axis in image and/or object space. Collimated light rays remain collimated as the collimated light rays strike an object's surface. In comparison, light rays from a standard backlight expand and interfere with one another. In the context of this document, telecentric illumination describes illumination in which a cone of light converges perpendicularly on every pixel. In non-telecentric illumination, each of different pixels is illuminated by a cone of light that is tilted differently with respect to the pixel. Collimation is used to describe optics that take diverging rays reflected from a pixel (mostly cone distribution) and makes all the reflected rays parallel at a specific direction. Different pixels are "collimated" to different directions.

Uniform Illumination

In order to assist in obtaining uniform illumination across the LCOS 106, the reflectivity of the S-polarization (a first polarization) should preferably increase along the lightguide, that is, increase from one facet in the sequence of facets 922P to a subsequent facet as the light propagates along the lightguide 20. First facets in the propagation path should be designed with relatively low reflectivity and last facets with relatively high reflectivity of the (first) S-Polarization. The transmissivity of the P-polarized light (a second polarization) reflected by the LCOS should be maximal for each facet. That is, the facets should be as transparent as possible to P-polarization. In the below description, generally S-pol reflectivity and P-pol transmissivity are used, and a telecentric illumination will be assumed for simplicity.

A first requirement is that the illumination of the LCOS 106 should preferably be uniform in order to achieve uniform image intensity (of reflected light 326). A second requirement is for near-eye-display optics (projecting optics 107) exit pupil should also be illuminated uniformly for optimal observation. These two requirements imply that the LCOS 106 pixels (pixels 434) should be illuminated uniformly and the illumination angle cone 432 angle should be uniform. In other words, preferably, 100% full spatial illumination and uniform angular illumination across the numerical aperture of the optical system.

Uniform illumination of the LOE lightguide 20 can be achieved if coupling from the source optics 300 fills completely the entrance to the lightguide 20. Therefore, the exit width 300W of the source optics 300 should preferably be equal or wider than the input width 20W of the lightguide 20. Furthermore, the source optics 300 should preferably also be illuminated uniformly, which can be achieved, for example, by use of diffusers and proper length of the initial 2D lightguide 9.

Some non-uniformity may exist in the light entering and propagating within the lightguide 20, and some uniformity may be introduced by the facets 922P themselves. To reduce and handle this non-uniformity, the first lightguide 10 that has internal partial reflecting facets 12 and the lightguide 20 sequence of polarization selective facets 922P are preferably in an overlapping configuration.

Figure 5A:
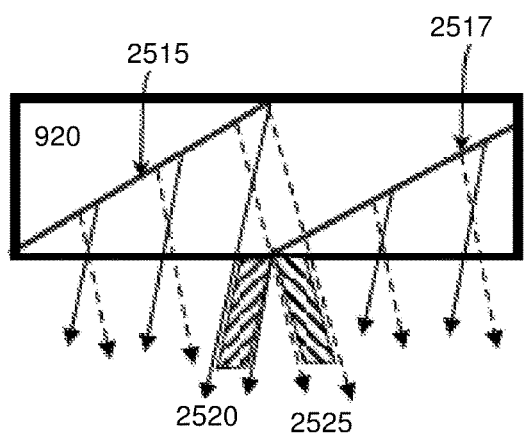
FIG. 5A, a schematic view of a lightguide with non-overlapping facets, illustrating the effects of variation on image uniformity.

Referring to FIG. 5A, there is shown a schematic view of a lightguide (such as lightguide 920) with non-overlapping facets, illustrating the effects of variation on image uniformity. A source of perceived non-uniformity relates to angular overlap of internal facets in different fields of view. In the region of the lightguide illustrated here, the lightguide contains internal facets (two are depicted as last facet 2515 and first facet 2517). Most of the out-coupled light is reflected from a single internal facet. However, at the edge of the facets, there is non-uniformity at off-axis angles. For a region of the FOV pointing to the left (marked as solid arrows), a conventional gap area 2520 (also generally referred to as an "underlapping area", "black line" area, or "dark strip" area) will not reflect any light, since at this angle there is an effective gap between the light reflected by the last facet 2515 and the first facet 2517, resulting in a dark strip in the perceived. On the other hand, light out-coupled to the right (marked as dashed arrows) has a conventional bright area 2525 (also generally referred to as a "partially overlapping" area, or "intense" area) within which there is overlap of the light reflected from 2515 and 2517 so that the lightguide will reflect almost twice the amount of light. Therefore, the non-uniformity in the current figure will vary between roughly 200% and 0% of the median image intensity across the extended aperture in different regions of the FOV and eye positions.

Figure 5B:
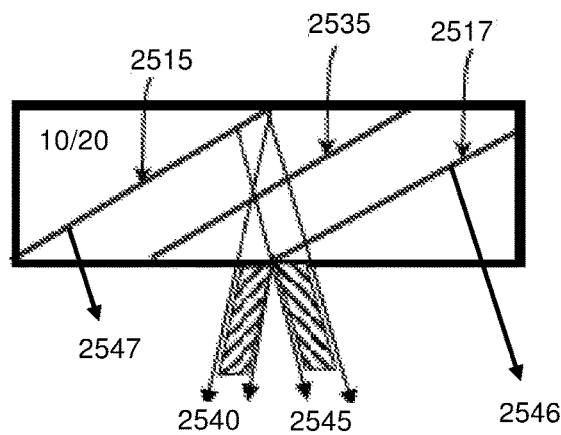
FIG. 5B, a schematic view of a lightguide with overlapping facets, illustrating the effects of variation on image uniformity.

Referring to FIG. 5B, there is shown a schematic view of a lightguide with overlapping facets, illustrating the effects of variation on image uniformity. Substantial overlap is introduced between the facets, as illustrated in the current figure. In this case, the spacing between adjacent facets is halved, resulting in most parts of the FOV at most eye positions receiving illumination from the image via overlaid reflections from two facets. In this exemplary case, a single middle facet 2535 is configured between the last facet 2515 and the first facet 2517. Near the angular extremities of the image and the extremities of the facets, there will still be changes in the number of overlapping facets which contribute to certain regions of the image, as illustrated by underlapping area 2540 which originates from only one facet (the middle facet 2535) and bright area 2545 which is contributed to by three adjacent facets (2517, 2535, and 2515. Therefore, the output non-uniformity will vary between 50% and 150% of the median reflectivity.

The light from the first half (light propagating from the right) of facet 2517 will couple out as reduced energy (ray/output beam 2546) since at this position there is no overlapping of the next facet 2535 i.e. there is only one facet reflect the light to the observer. The same reduced power happens at the last half of facet 2515 (ray/output beam 2547). In these regions, the reflectivity will be 50% of the median reflectivity.

Figure 5C:
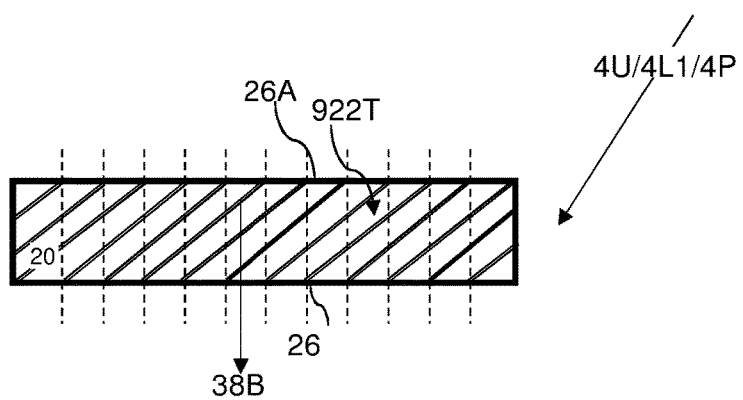
FIG. 5C, a sketch of triple facets

Referring to FIG. 5C, there is shown a sketch of triple facets (triple facet crossing, triple overlap). Similar to the other examples, a lightguide (the lightguide 20) includes overlapping internal facets 922T, which are shown as double-lines, between the first surfaces (26, 26A). A solid arrow shows a nominal ray crossing three facets and then outcoupled from the substrate (arrow outcoupling ray 38B). As in similar figures, dashed lines are used to show alignment of the facets 922T. In this example, multiple (specifically two) first partial facets and multiple (two) last partial facets are shown.

In the current embodiment, management of configuration of facets in an overlapping configuration, specifically optimizing the overlap to obtain a constant number of facets (more than one) reflecting light onto the observer, in other words, at least two facets reflect light toward a FOV of an observer, can reduce non-uniformity of light output from the lightguides.

Figure 6:
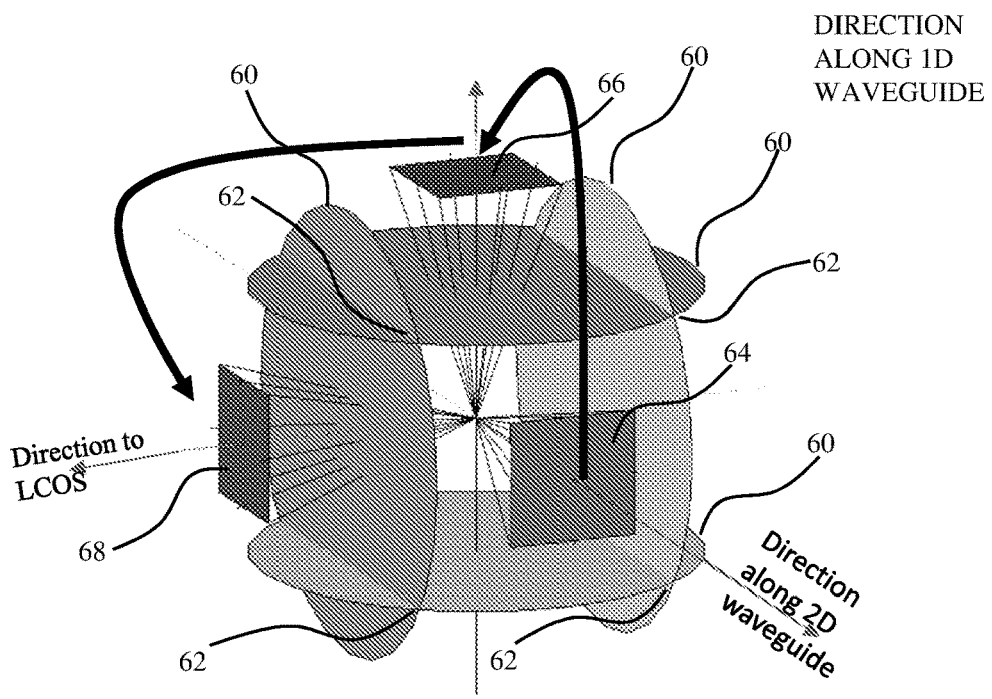
FIG. 6, a sketch of an angular space architecture of the lightguide 20.

Referring to FIG. 6, there is shown a sketch of an angular space architecture of the lightguide 20 (FIG. 3A, FIG. 3B) being fed by the first exemplary embodiment 300C (FIG. 3C). Efficiency of extracting the light from the lightguide 20 depends on the angles and coating parameters of the facets 922P. Exemplary parameters used for the current case are based on BK7 glass and MY-130 glue, but other optical materials may be used.

The critical angles 60 (represented as circles) of the first lightguide 10 are 59 degrees within a BK7 glass lightguide surrounded by protective coating having n=1.3. Four circles represent the critical angles 60 of the four external facets of the lightguide 20. The unpolarized light source 2U and the 2D lightguide 9 generate uniform illumination distribution, therefore we can assume for simplicity that the angular area between the critical angles 62 is uniformly illuminated. Assuming rectangular aperture of the projecting optics 107 having f/2, then the half angle divergence of the required image light is 14 degrees as presented by illumination 64. This required illumination angular distribution propagate along the first lightguide 10 until reflected by the facets 12 at 45 degrees onto the lightguide 20 as depicted by required illumination 66. As the required illumination 66 propagates along the first lightguide 10, the required illumination 66 is reflected by the facets 922P at 45 degrees out of the lightguide 20 and onto the LCOS 106 as depicted by illumination 68.

In order to minimize scattering, it is preferable that the coatings on the facets 12 and the facets 922P have reflectivity of S-polarization at the required angles only. In this example, this should be approximately ±14 degrees around 45 degrees.

The efficiency of this configuration of the present invention is determined by the ratio of the illumination angular distribution (within the angular area defined by the critical angles 62) to the required angular area of the illumination 64. The 2D lightguide 9 (including optional diffusers) with limited angular distribution overlapping the required distribution can optionally be used to improve efficiency.

Figure 7:
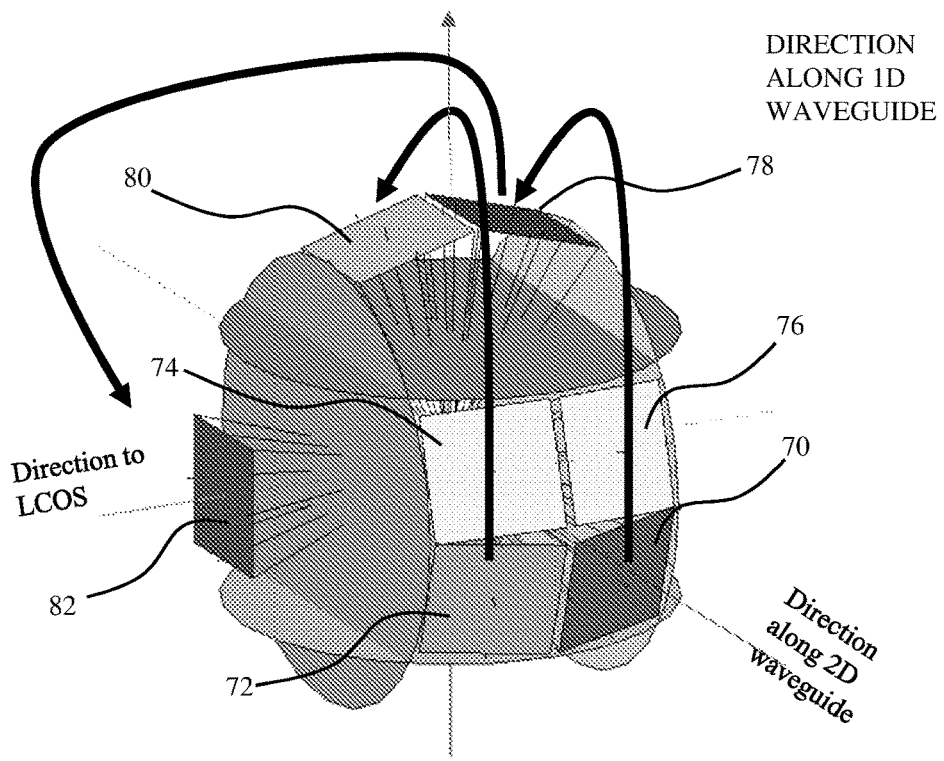
FIG. 7, a sketch of an angular space architecture of FIG. 6 with improved energy extraction.

Referring to FIG. 7, there is shown a sketch of an angular space architecture of FIG. 6 with improved energy extraction. The axis and the critical angles are the same as described in reference the case of FIG. 6.

The required optical illumination angular distribution 70 has the same parameters as in FIG. 6 but is off-center. This way, this distribution is reflected by the four external facets of the first lightguide 10 to generate distributions 70, 72, 74 and 76. These four distributions engage energy as the four distributions propagate along the first lightguide 10.

The facets 12 in this embodiment are at 37 degrees and have coating that partially reflects S-polarization at angles between 20 to 53 degrees (relative to facet vertex). These facets 12 will reflect distributions 70 and 72 onto the lightguide 20 as distributions 78 and 80 respectively. These two distributions (78, 80) also exchange energy as the two distributions propagate along the lightguide 20.

The facets 922P within the lightguide 20 (having same parameter as in the first lightguide 10 in this example) partially reflect distribution 78 out of the lightguide 20 onto the LCOS 106 as distribution 82.

In the current embodiment, the facets partially reflect the light and the continuous coupling with the other distributions within the lightguide enable more energy to be coupled to the required distribution. It is apparent from the current figure that the combined distribution of 70, 72, 74, and 76 fills efficiently the illuminating angular distribution between the critical angles of the first lightguide 10.

A combination of facet (12, 922P) and corresponding coatings can be designed in the lightguides (10, 20) to convert light propagating with a large angle (relative to a normal to the facets) to propagate with a relatively shallower angle. This design combination can be based on reflection at high angles and facets at low angles, preferably only with regard to S-polarization. This design combination can improve efficiency as compared to implementations allowing light to propagate with high angles.

Figure 8:
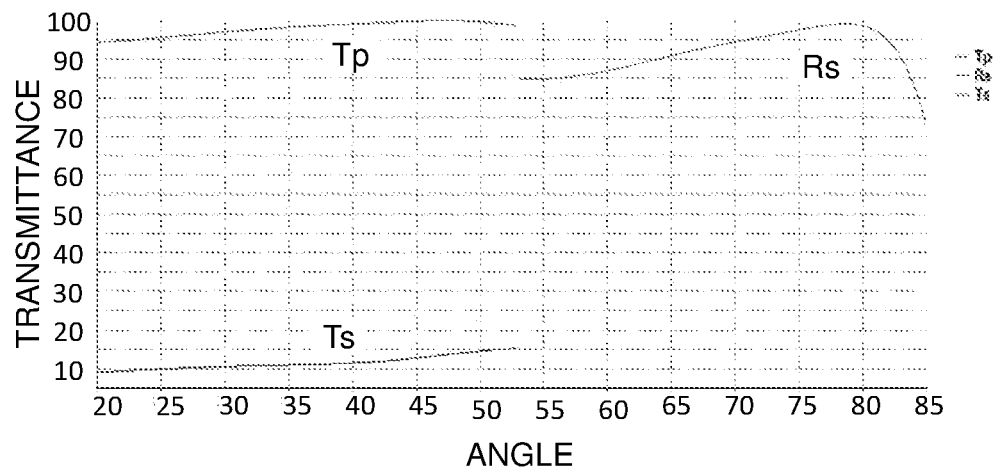
FIG. 8, a chart of performance of coating designed for the configuration of FIG. 7.

Referring to FIG. 8, there is shown a chart of performance of coating designed for the configuration of FIG. 7. The performance in the current chart includes overlapping facets. The reflectance of S-polarization Rs (toward the LCOS 106) is 10-15%, while the transmittance of the P-polarization Tp (from the LCOS 106 toward the projecting optics 107) is >95%. The transmittance of the other images Ts (74, 76 and 80) is relatively good >85% in most of the angular spectrum. Reflectivity of Rs can cause energy loss to unobservable directions.

The coating design of FIG. 8 is based on an exemplary multi-layer refractive configuration. However, lower cost (with somewhat lower performance) single layer can be used including a glue with different refractive index.

Figure 9:
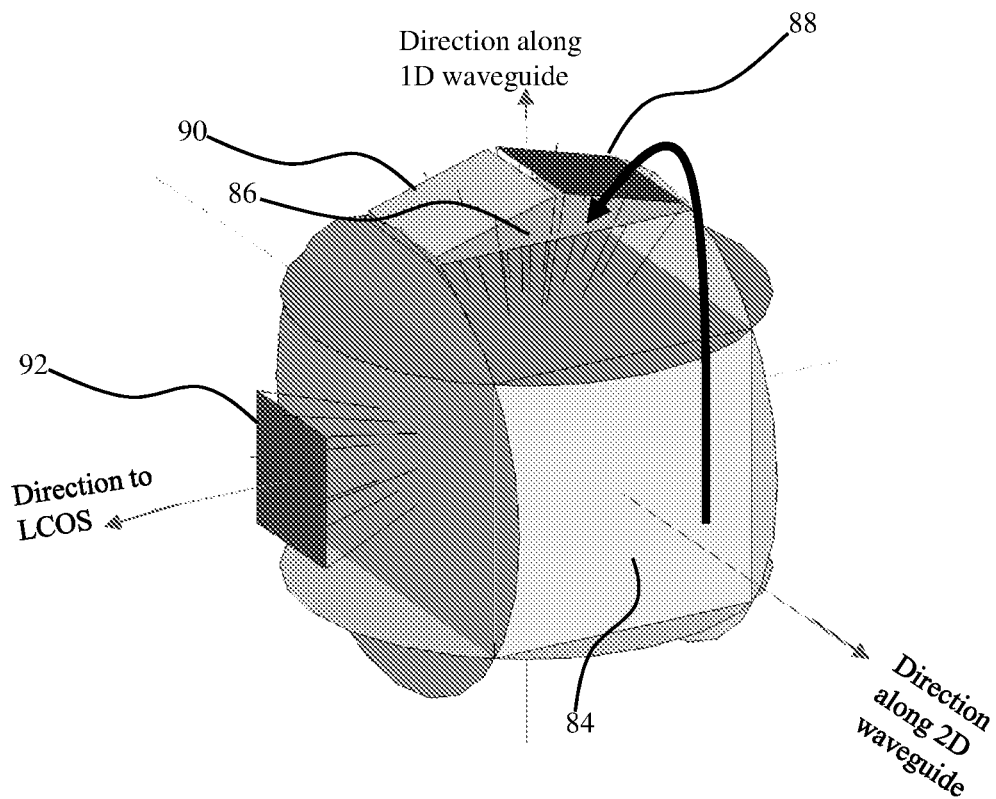
FIG. 9, a sketch of angular distribution of a configuration including tapered (or cylindrical lens) expansion of the second exemplary embodiment 300D.

Referring to FIG. 9, there is shown a sketch of angular distribution of a configuration including tapered (or cylindrical lens) expansion of the second exemplary embodiment 300D. The configuration depicted in the second exemplary embodiment 300D describes a tapered 1D expansion of the light (the unpolarized light 4U using the tapered non-imaging lightguide 326) from the 2D lightguide 9. This expansion can also optionally be by cylindrical lenses. It is common knowledge to perform these types of expansion by preserving the Etendue of the light distribution. This way, the spatial expansion of the width of the illumination is accompanied by equivalent reduction of the angular distribution of illumination on the same axis.

The angular illumination distribution in the 2D lightguide 9 (illumination between all critical angles) is depicted as area 84. The tapered conversion is depicted as a transformation to thin rectangle 86 (the rotation from one direction to another is not mandatory and is for clarity).

The required intensity distributions 88 and 90 exchange energy and coupled out to 92 by facets 922P the same way as 78 and 80 in FIG. 7. This way, the conversion of light energy from the lightguide 9 to the required illumination distribution is improved in efficiency.

Figure 10A:
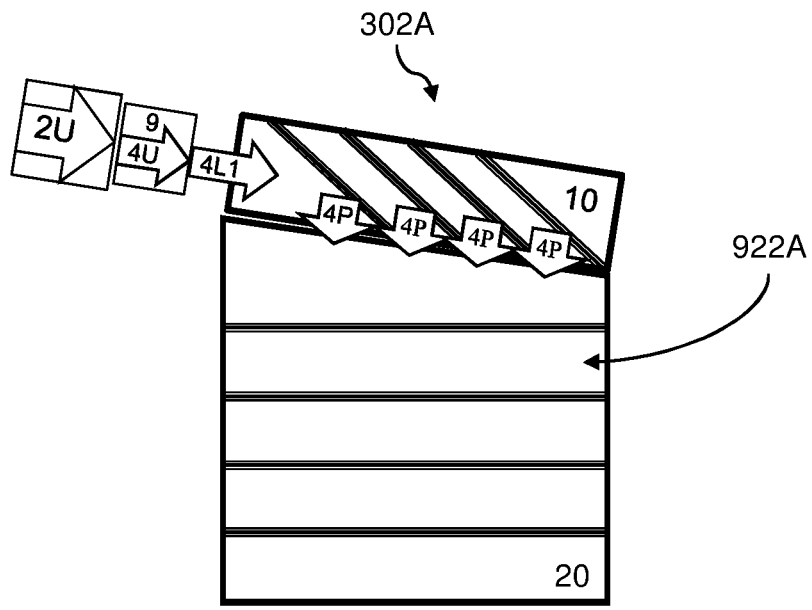
FIG. 10A, a sketch of a first optional architecture for optical illumination 302A.

Referring to FIG. 10A, there is shown a sketch of a first optional architecture for optical illumination 302A. A tilted angle is between the first lightguide 10 and the lightguide 20 can be used for optimizing the angular parameters of the coating depicted in FIG. 8.

Figures 10B, 10C:
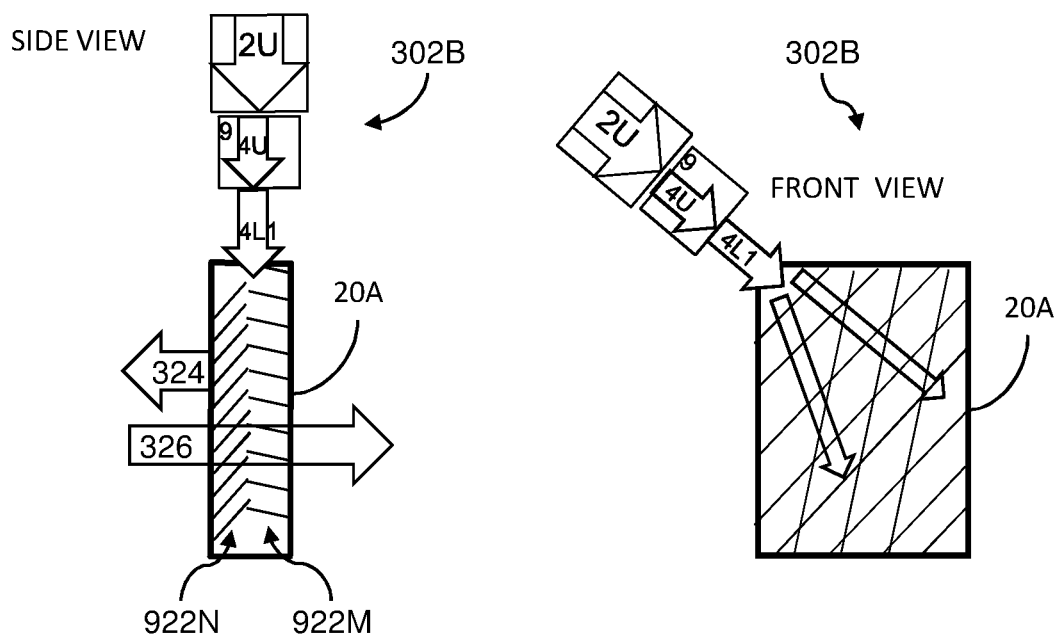
FIG. 10B and FIG. 10C, respective side and front view sketches of a second optional architecture for optical illumination 302B.

Referring to FIG. 10B and FIG. 10C, there are shown respective side and front view sketches of a second optional architecture for optical illumination 302B. The source optics 300 provides uniform illumination light 4L1 (in this case polarized or unpolarized) into an overlapping lightguide 20A having a first set of facets 922M and a second set of facets 922N. The crossing (overlapping) orientations of the first and second sets of facets cause lateral expansion of the source aperture within the overlapping lightguide 20A and projects the first polarization of light 324 while transmitting the second, orthogonal, polarization of light 326.

Figure 11A:
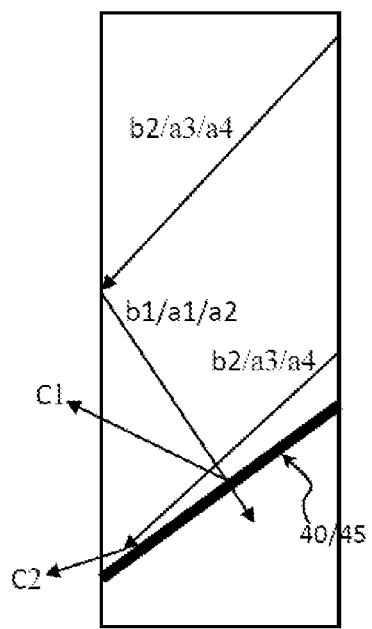
FIG. 11A and FIG. 11B, the reflection process by the internal facets in lightguides 10 and 20.
Figure 11B:
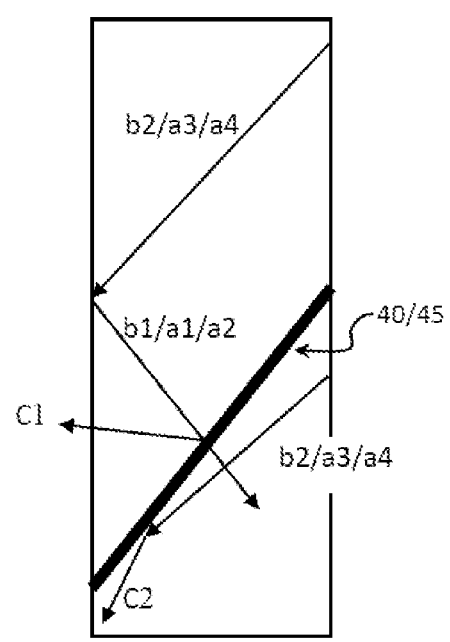

Referring to FIG. 11A and FIG. 11B, there is shown the reflection process by the internal facets in lightguides 10 and 20. Two basic configurations are depicted, and differ by the relative angles of the light beams and the facets. In this schematic illustration, the beams a1, a2 and b1 are depicted as same vector (for simplicity referred to as beam b1) since the same geometrical considerations apply to each as observed from a side view of the corresponding lightguide. Beams a3, a4 and b2 are also depicted as same vector (reference will be only to b2). The beam b1 represents 74, 78, 80, or 90. Beam b2 represent 70, 72, 78, or 88.

Light beams b2 are actually a bundle of rays propagating in same direction as depicted by two vectors in FIG. 11A. In this case, one vector is reflected by the external face to become beam b1 and onto an internal facet 40 (corresponding to facets 922P) where part of the one vector is reflected as beam c1. The other beam b2 vector is reflected directly by facet as vector beam c2. The vector beams c1 and c2 represent the normal image and ghost image not necessarily in this order. In this configuration, beams b1 and b2 impinge on the facet 40 from the same side.

FIG. 11B describes a similar process as described with reference to FIG. 11A, but where the geometry is such that beams b1 and b2 impinge on facet 40 from opposite sides of facet 40.

In both cases, the magnitude of reflection for images c1 and c2 in S- and P-polarizations is determined by the coating on these facets 40. Preferably, one reflection is the image and the other is suppressed since the other image corresponds to an unwanted "ghost" image. Suitable coatings for controlling which ranges of incident beam angles are reflected and which ranges of incident beam angles are transmitted can be found described in detail in U.S. Pat. Nos. 7,391,573 and 7,457,040, coassigned with the present invention.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. An optical system comprising:
   (a) a lightguide having:
   (i) a first external surface and a second external surface, said first and second external surfaces being mutually parallel, and
   (ii) a first sequence of facets, at least a portion of which are a plurality of parallel, partially reflecting, and polarization selective surfaces, each of said facets reflecting a portion of a first polarized light and transmitting a remaining portion of said first polarized light, and transmitting a second polarized light, said sequence of facets being at an oblique angle relative to said first and second external surfaces, and between said first and second external surfaces,
   (b) a front-lit reflective polarization-rotating image modulator deployed to spatially modulate light coupled-out from said first external surface, and to output reflected light corresponding to an image, said image modulator being deployed such that said reflected light traverses said lightguide from said first external surface via said first sequence of facets to said second external surface;
   (c) a polarizer deployed to selectively transmit image illumination emerging from said second external surface corresponding to said second polarization reflected from the image modulator; and
   (d) an illumination source optically coupled to said light guide to introduce into said light guide light of at least said first polarization so as to propagate by total internal reflection at said first and second external surfaces, said light being progressively partially reflected by successive facets of said first sequence of facets towards said image modulator, reflected light of said second polarization corresponding to the image being transmitted by said facets and by said polarizer.

2. The optical system of claim 1, wherein reflectivity of said first polarization increases from one facet to a subsequent facet in said first sequence of facets.

3. The optical system of claim 1, wherein said first sequence of facets expands light in-coupled to said light-guide such that said light is uniformly coupled-out of said first external surface.

4. The optical system of claim 1, wherein said image modulator is a liquid crystal on silicon (LCOS) matrix.

5. The optical system of claim 1, wherein said facets are constructed at least in part using a technique selected from the group consisting of:
 (a) multi-layer coatings,
 (b) a dielectric coating; and
 (c) a wire-grid.

6. The optical system of claim 1, wherein reflectivity of each of said facets is dependent on an angle at which light impinges on said facet.

7. The optical system of claim 1, wherein said first sequence of facets is configured to perform coupling-out of light from said first external surface, said first sequence of facets having a constant number of facets overlapping in a line of sight toward a nominal point of observation of light coupling-out of said first external surface.

8. The optical system of claim 1, further comprising:
 a second sequence of facets, at least a portion of which are:
  a plurality of parallel, partially reflecting, and polarization selective surfaces,
  at an oblique angle relative to said first and second external surfaces, and
  between said first and second external surfaces,
 wherein the facets of said first sequence of facets and said second sequence of facets are non-parallel relative to each other.

9. The optical system of claim 8 wherein each of said sequences of facets spans an area of coverage, said spanning being an area over which each of said sequences of facets are deployed, and wherein said areas of coverage for said first and second sequences of facets are at least partially overlapping.

* * * * *